(12) United States Patent
Fuentes Samaniego et al.

(10) Patent No.: US 8,997,489 B2
(45) Date of Patent: Apr. 7, 2015

(54) ENHANCED ELECTRICITY COGENERATION IN CEMENT CLINKER PRODUCTION

(75) Inventors: Raul Fuentes Samaniego, Monterrey (MX); Luis Ramon Martinez Farias, San Pedro Garza Garcia (MX); Antonio Higinio Noyola De Garagorri, Monterrey (MX); Luis Trevino Villareal, Port (CH)

(73) Assignee: Cemex Research Group AG, Brügg Bei Biel (CH)

( * ) Notice: Subject to any disclaimer, the term of this patent is extended or adjusted under 35 U.S.C. 154(b) by 411 days.

(21) Appl. No.: 12/996,309

(22) PCT Filed: Jun. 4, 2009

(86) PCT No.: PCT/IB2009/005857
§ 371 (c)(1),
(2), (4) Date: Mar. 3, 2011

(87) PCT Pub. No.: WO2009/147513
PCT Pub. Date: Dec. 10, 2009

(65) Prior Publication Data
US 2011/0140459 A1    Jun. 16, 2011

(51) Int. Cl.
F01K 13/00 (2006.01)
F27B 17/00 (2006.01)
F02B 7/02 (2006.01)
C04B 7/47 (2006.01)
F27D 17/00 (2006.01)

(52) U.S. Cl.
CPC ............. *C04B 7/475* (2013.01); *C04B 2290/20* (2013.01); *F27D 17/004* (2013.01)

(58) Field of Classification Search
None
See application file for complete search history.

(56) References Cited

U.S. PATENT DOCUMENTS

| | | | | |
|---|---|---|---|---|
| 3,498,594 A | * | 3/1970 | Rikhof | 106/743 |
| 3,661,553 A | * | 5/1972 | Frans | 75/484 |
| 3,677,534 A | * | 7/1972 | Frans | 266/140 |
| 4,052,148 A | * | 10/1977 | Pennell et al. | 432/1 |
| 4,077,763 A | * | 3/1978 | Jager et al. | 432/14 |
| 4,504,319 A | * | 3/1985 | Wolter et al. | 106/767 |
| 4,533,396 A | * | 8/1985 | Herchenbach et al. | 106/758 |
| 5,026,275 A | * | 6/1991 | Hundebol | 432/14 |
| 5,216,844 A | * | 6/1993 | Tamburini et al. | 60/648 |
| 5,216,884 A | * | 6/1993 | Holsiepe | 60/648 |
| 5,437,721 A | * | 8/1995 | Kupper et al. | 106/739 |

(Continued)

FOREIGN PATENT DOCUMENTS

EP    0 492 133    7/1992

*Primary Examiner* — Thomas Denion
*Assistant Examiner* — Steven D Shipe
(74) *Attorney, Agent, or Firm* — Harness, Dickey & Pierce, P.L.C.

(57) ABSTRACT

The disclosure relates to a method to produce electricity in a cement clinker production utilizing a kiln and/or a precalciner as combustion chambers to generate electricity, the method including:
  a. supplying fuel to the precalciner and/or the kiln in a quantity corresponding to at least 110% of a heat value requirement for clinker production operation of the precalciner and/or the rotary kiln per unit weight of clinker, respectively;
  b. bypassing a portion of hot flue gases from at least one of (i) the kiln and/or (ii) the precalciner;
  c. leading hot flue gases to a heat recovery steam generator producing steam;
  d. producing electricity with a power island including a steam turbine equipped with an electrical generator.

13 Claims, 2 Drawing Sheets

(56) References Cited

U.S. PATENT DOCUMENTS

| | | | |
|---|---|---|---|
| 5,643,548 A * | 7/1997 | Bammer et al. | 423/540 |
| 6,176,187 B1 * | 1/2001 | Leonard et al. | 110/215 |
| 6,264,738 B1 * | 7/2001 | Lorke et al. | 106/739 |
| 6,749,681 B1 * | 6/2004 | Burdis et al. | 106/744 |
| 7,001,177 B1 | 2/2006 | Alemany et al. | |
| 7,001,454 B2 | 2/2006 | Lopez-Gonzales et al. | |
| 7,189,074 B2 * | 3/2007 | Leung et al. | 432/14 |
| 2003/0059735 A1 * | 3/2003 | Burdis et al. | 432/58 |
| 2008/0092781 A1 | 4/2008 | Ramirez Tobias et al. | |
| 2011/0140459 A1 * | 6/2011 | Fuentes Samaniego et al. | 290/1 R |
| 2011/0168060 A1 * | 7/2011 | Kupper | 106/771 |
| 2012/0129109 A1 * | 5/2012 | Hunsinger | 431/2 |

\* cited by examiner

ENHANCED ELECTRICITY COGENERATION IN CEMENT CLINKER PRODUCTION

CROSS-REFERENCE TO RELATED APPLICATIONS

This application is a National Phase Entry of International Application No. PCT/IB2009/005857, filed on Jun. 4, 2009, which claims priority to PCT/IB2008/001447, filed on Jun. 5, 2008, both of which are incorporated by reference herein.

FIELD OF THE INVENTION

The invention relates to a method of enhanced electricity generation/cogeneration in cement clinker production from cement raw meal.

BACKGROUND

Typically, in a dry process of cement manufacture, cement clinker production unit comprises a preheater wherein the raw meal is preheated, a precalciner wherein the preheated raw meal is partially, around 90%, calcined to transform the $CaCO_3$ into $CaO$ and $CO_2$, a kiln wherein the meal is fully calcined and sintered to form the clinker, and a clinker cooler. The precalciner and the kiln are supplied with fuel and the preheater stage is heated by hot flue gases coming from the precalciner and from the kiln. Moreover, air heated in the cement clinker cooler is supplied to the kiln and to the precalciner as combustion air. At the best, the design specific heat consumption of the aforementioned process is around 690 kcal per kilogram of clinker while the theoretical heat consumption is around 420.

Thus, in cement clinker production, the energy efficiency is limited by two factors:

i) the gases entering the preheater have more heat than needed to preheat efficiently the raw material, as the flue gas flow is increased around 50% by the carbon dioxide released and since the most endothermic reaction: calcination, only occurs in theory above 800° C. but closer to 900° C. in practice; and ii) the produced clinker needs more air to cool than that needed for efficient combustion, so there is an energy loss through the cement clinker cooler.

Moreover, cement manufacturing process involves a very high electrical consumption (around 120 kWh per ton of cement or 150 kWh per ton of clinker) related to the raw meal preparation (crushing, milling, transportation), due to the use of very large air fans (transportation, classification, clinker cooling) and cement grinders, for instance.

In order to increase the energy efficiency of such installation, it is known to use cogeneration technology. Usually, exit flue gases from the preheater stage receiving the raw meal and/or the excess hot air from the clinker cooler are led to heat recovery steam generators, and an electric generating device comprising a steam turbine with an electrical generator is driven by the produced steam. U.S. Pat. No. 6,749,681 describes a method for producing electricity and calcined raw mix in a circulating fluidized bed reactor and illustrates the use of the calcined raw mix to produce clinker. However, the technologies of circulating fluidized bed reactor are expensive and therefore, little-used for cement clinker production.

U.S. Pat. No. 4,052,148 discloses a cement clinker production unit wherein fuel is injected to a steam generator and flue gases discharged from the steam generator are sent to the cement clinker production process. Alternatively, flue gases bypassed from the cement clinker production process are sent to the steam generator as combustion air. The aim of this method is to decrease fuel consumption in the cement clinker production and to produce electrical energy. However, this document does not teach supplying more fuel to the precalciner and/or to the kiln than needed for the cement clinker production process.

Therefore, in the design case of 690 kcal per kg of clinker, around 1.7 tons of gases per ton of clinker (of which around 0.6 is the $CO_2$ released) leave the preheaters at a temperature of around 293° C. and the average electrical energy produced by usual cogeneration systems is around 15 kWh per ton of clinker. The electrical energy that can be produced by the excess hot air from the clinker cooler is about the same, so altogether 30 kWh per ton of clinker can be produced with this specific heat consumption. Since the average consumption of the cement production process is 150 kWh/Ton of clinker, cogeneration covers only 20% of the consumption.

Moreover, although the power industry has moved towards more efficient combined cycles, electricity remains an expensive commodity due to the natural gas price increase owing to its non-renewable characteristic. Efforts have been made to use negative-cost or less-expensive fuels, such as wastes and low grade alternative fuels, by gasification, fluidized beds and other technologies, but these technologies are expensive. To respond to the energy price increase, the cement industry becomes more fuel energy effective and the fuel consumption per kg of produced clinker decreases.

Furthermore, the cement industry partly switches fuels to low-grade alternative fuels and wastes without the use of the aforementioned technologies required by the power industry. It turns out that the cement clinker production process works like a natural fluidized bed due to its highly alkaline environment and the long residence time, with the additional advantages of its high temperature, and that the solid waste is safely incorporated into the cement. Nevertheless, the use of high humidity and/or low heating value fuels and waste in the cement clinker production, combined with the high excess air usually needed to burn such fuels, increases the volume of hot flue gases and decreases efficiency, but still with economic and environmental benefits from the fuel switching. Under these conditions the flow of gases leaving the preheaters increases as well as its temperature, raising the cogeneration capability. A typical value of the cogeneration of the preheater and the clinker cooler combined is 40 kWh/Ton of clinker, which covers 27% of the average consumption of the cement production process of 150 kWh/Ton of clinker. However, the electrical needs of the cement production process remain significant and this kind of cogeneration does not take full advantage of the fact that the cement clinker production process is a natural substitute of an expensive fluidized bed.

SUMMARY

Accordingly, the aim of the invention is to remedy the above-drawbacks by providing a method to produce a higher amount of electrical energy in the cement clinker production process and having a higher overall energy efficiency considering the complete process. This is achieved, according to the invention, by a method to produce electricity in a cement clinker production unit utilizing a kiln and/or a precalciner as combustion chambers to generate electricity, the method comprising:

a. supplying fuel (30,31) to the precalciner (3) and/or the kiln (5) in a quantity corresponding to at least 110% of the optimized heat value requirement for the clinker production operation of the precalciner (3) and/or the rotary kiln (5), respectively, per unit weight of clinker;

b. bypassing a portion of hot flue gases from at least one of the following sources: (i) the kiln and/or (ii) the precalciner;

c. leading the said bypassed portion of hot flue gases to a heat recovery steam generator producing steam (with dust and incrustation separation means, and valves and/or induced draft fans);

d. producing electricity with a power island comprising a steam turbine with an electrical generator driven by the steam (including all common ancillary equipment such as condenser, water pumps and so on).

Thus, the overall energy efficiency of the clinker-electrical power production and the capability of the cement clinker production process to convert low grade alternative fuels and waste to electrical power increase.

Bypassing a portion of hot flue gases from the kiln and/or the precalciner combined with the injection of more fuel than needed increase the amount of power that can be generated and the amount of waste and low grade alternative fuel that can be used. With this method, power is simultaneously i) generated through the injection of more fuel than needed for the cement clinker production process, and ii) cogenerated through heat loss recovery from the cement clinker production process. Thus, through heat loss recovery, the efficiency of the additional fuel consumption is higher than that of the Rankine cycle and, under some circumstances, outperforms the efficiency of a typical combined cycle (55%).

Furthermore, if waste is used, besides the economical benefit of using low—or even negative—cost fuels, there would be environmental benefits from the waste disposal since cement clinker production plants are available worldwide, which is not the case of the fluidized beds or gasifiers commonly needed to dispose waste. Moreover, according to the invention, the overall electrical needs of the cement production can be fully covered and there may be excess power to export or to be sold, taking advantage of the new electrical markets. It should be pointed out that supplying a kiln and/or a precalciner with an additional amount of fuel is in opposition with conventional energy efficiency consideration in clinker production that suggests reducing fuel consumption of the process. Thus, this method highly modifies the way to optimize the fuel supplied.

Advantageously, the heat recovery steam generator produces superheated steam with a temperature higher than 400° C. and pressure higher than 35 bars-absolute and the steam turbine is a high-pressure turbine. Thus, this method highly modifies the low temperature-low pressure (around 250-300° C./10 bars) concept in usual cogeneration systems. Thus, the Rankine cycle efficiency is high because it increases with the pressure and the temperature. Therefore, since high-enthalpy superheated steam is used, more power will be produced and less cooling water will be required since less steam per unit of power produced has to be condensed.

Advantageously, fuel is supplied in a quantity corresponding to more than 120% of the optimized heat value requirement per unit weight of clinker, preferably more than 140% and more preferably more than 200%. Advantageously, hot flue gases being bypassed in such a way that the amount of the preheater exit gases is lower than 1.5 tons of gases per ton of clinker, preferably less than 1.3 tons of gases, more preferably less than 1 and very preferably less than 0.8.

In a preferred embodiment, hot flue gases are bypassed from the rotary kiln and the precalciner. Preferably, the ratio of hot flue gases by-passed from the rotary kiln to the hot flue gases bypassed from the precalciner is less than 1, preferably less than 0.5 and more preferably less than 0.35. Preferably, hot flue gases may be further bypassed from the preheater(s) and/or some raw meal can be injected elsewhere from the conventional injection point to control the process.

The method advantageously comprises:

injecting additional air directly into the precalciner combustor and/or into the kiln as combustion air and as a mean of refractory temperature control; and/or injecting additional air directly into the preheater(s) to compensate for any disturbance in the preheater(s); and/or partially or totally reinjecting cold flue gases discharged from the process and/or the heat recovery steam generator into the kiln and/or the precaliner and/or the preheater(s), through the use of induced draft fan(s).

Thus, the electrical power generation further increases. Moreover, injection of air or cold flue gases allow to control any possible disturbance in the clinker production process due to the extraction of the hot flue gas through the by-passes, and/or to get a maximum flow and/or temperature of the aforementioned bypassed flue gases.

In a preferred embodiment of the invention, the injection of recirculated cold flue gases substitutes as much as possible the injection of air, to increase the overall energy efficiency and to increase the carbon dioxide concentration of the flue gases, making its extraction relatively easier to contribute to preventing global warming. In a preferred embodiment, the power island sends back water preheated by feed water heaters to avoid corrosion and/or incrustation. In a preferred embodiment, the installation comprises an additional water economizer wherein water feeding the heat recovery steam generator is heated by flue gases discharged from the preheater.

BRIEF DESCRIPTION OF THE DRAWINGS

The present invention will now be illustrated, merely by way of example, with reference to the following drawings.

DETAILED DESCRIPTION

Figure 1:
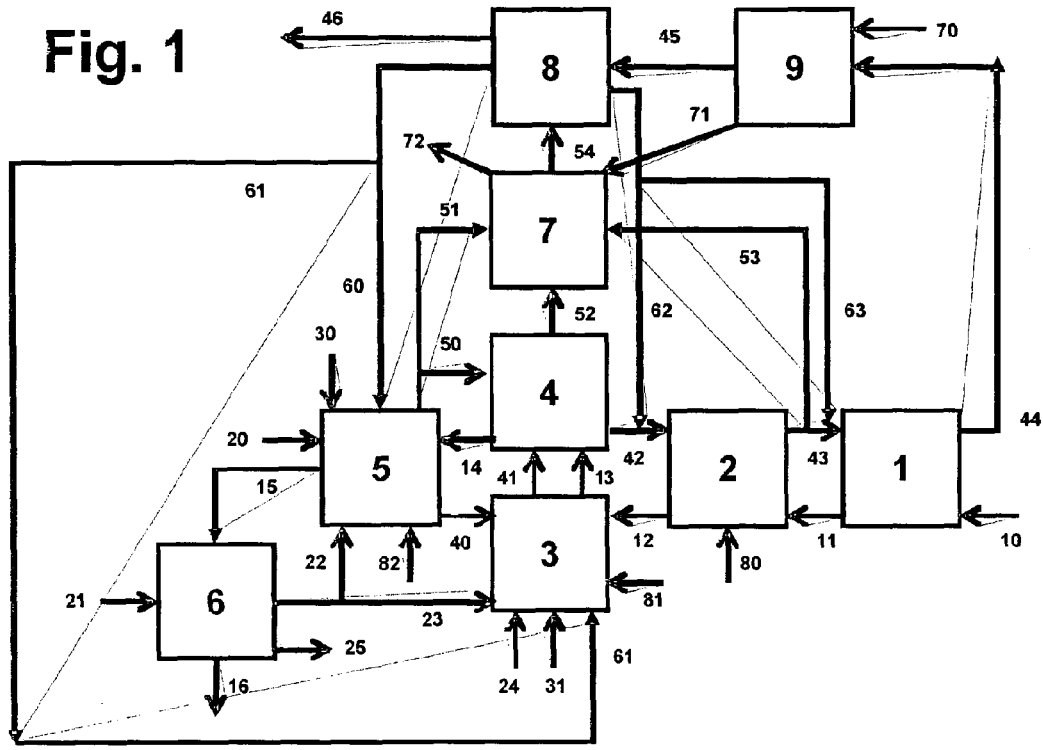
FIG. 1 is a schematic diagram of the preferred embodiment of the invention, showing the main involved equipments and the flow of solids, air, fuel, flue gases, recirculated flue gases, water and steam.

Equipment 1 thru 6, and flows 10 thru 44, represent a typical cement clinker production process from cement raw meal. In a dry process of cement manufacture, raw meal 10 is successively introduced to the preheaters 1 and 2 wherein its temperature is raised and its water content is evaporated. Each of preheaters 1, 2 may comprise one or more cyclone preheating stages. Preheaters 1, 2 are heated by the hot flue gases 42 discharged from the precalciner 3, 4.

The preheated raw meal 12 is introduced to the precalciner combustor 3 where most of the calcination process takes place. The partially precalcined meal 13 and the flue gas 41 discharged from the precalciner combustor 3 are separated in a precalciner cyclone separator 4. The partially precalcined meal 14 is then introduced into the rotary kiln 5 wherein clinker is produced. The hot clinker 15, at a temperature of around 1500° C. is discharged to the cement clinker cooler 6. In a best case, the temperature of the cooled clinker 16 discharged from the clinker cooler 6 is around 100° C.

Air gets into the process as primary combustion air 20 to the rotary kiln 5, as cooling air 21 to the cement clinker cooler 6, and may enter as auxiliary combustion air 24 to the precalciner stage 3. The air heated in the cement clinker cooler goes into the rotary kiln 5 as secondary combustion air 22 and to the precalciner stage 3 as tertiary combustion air 23. The cooling air discharge 25 represents the air not used for combustion. It should be pointed out that, according to the invention, since more fuel is supplied in the precalciner combustor 3 and in the kiln 5 than in a conventional cement clinker production process, a supplementary air injection 24 may be needed because air discharge 25 will be reduced, and even may vanish to increase hot air flow 22, 23 extracted from the air clinker cooler 6.

Fuels 30 and 31 are introduced into the rotary kiln 5 and into the precalciner combustor 3, respectively. Preferably, fuels 30 and 31 are low-cost, low-grade alternative fuels or wastes.

Hot flue gases 40 discharged from the rotary kiln 5 are sent to the precalciner combustor 3 to use its high heat content. The temperature of hot flue gases discharged from the kiln is around 1200° C. Hot flue gases 41 discharged from the precalciner combustor, enter a precalciner cyclone separator wherein flue gases 41 are separated from the partially precalcined meal 13. The resulting flue gases 42, at a temperature of around 900° C., are then sent onto the preheaters, 2 and 1 in order to heat and evaporate the water content of the raw meal 10, 11. Without bypassing, the cooled exit gases 44 discharged from the preheater 1 still contain substantial amounts of heat, typically their temperature is around 290-450° C.

In the present invention, fuel is introduced into the rotary kiln 5 and/or into the precalciner 3 in a quantity corresponding to at least 110% of the optimized heat value requirement of the rotary kiln 5 and/or the precalciner 3, respectively, per unit weight of clinker. Therefore, according to the present invention, all flue gases of the additional fuel (overfire of at least 10%) introduced into the rotary kiln 5 and/or into the precalciner 3 are fully bypassed to the heat recovery steam generator 7.

The optimized required heat value requirement refers to the heat value required for clinker operation production, which is typically optimized for a given installation wherein no flue gas is bypassed. As it is widely known, the optimized required heat value depends on the intrinsic features of the cement clinker production unit: design of the kiln, of the precalciner; gas releases (such as NOx, SOx or Chlorine . . . ); the properties of the raw meal (moisture, fineness, etc) the properties of the fuels 30, 31, and so on. According to the invention, fuel is supplied in a quantity corresponding to 110% of the optimized heat value requirement for the clinker production operation in a given installation to utilize the kiln and/or the precalciner as combustion chambers to generate electricity.

Figure 4:
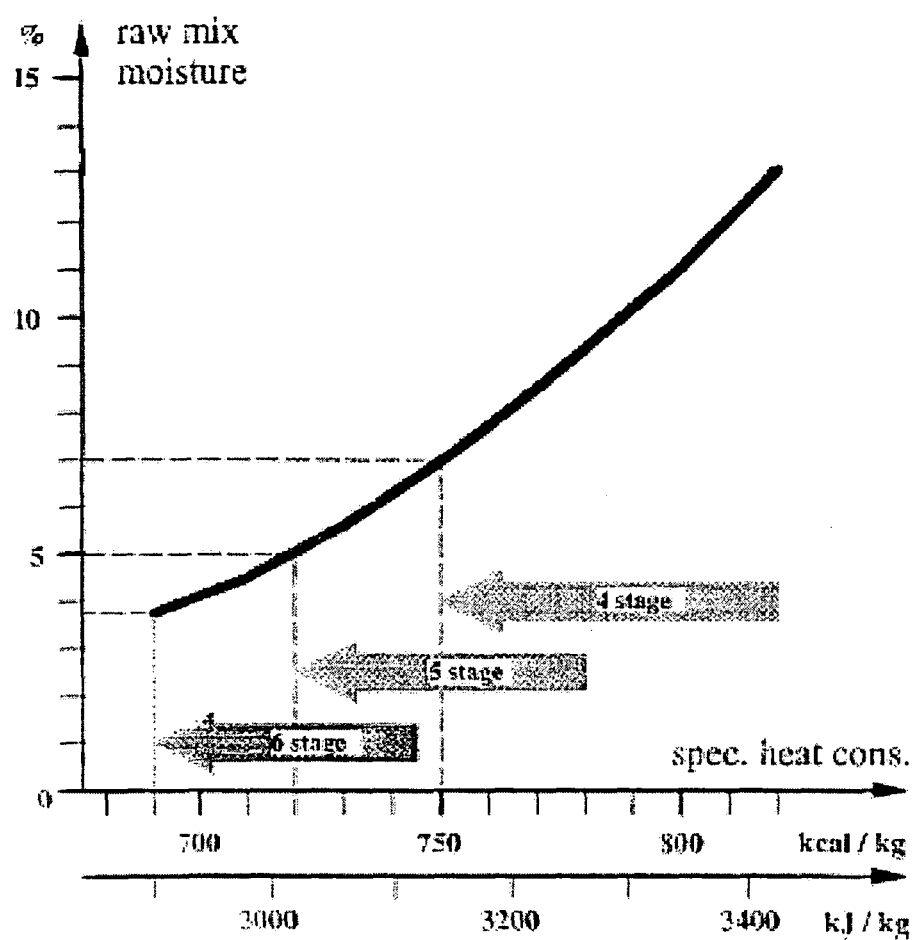
FIG. 4 shows a graph presenting the relationship between number of preheater stages, drying capacity and specific heat consumption of a cement clinker production unit, by way of example.

FIG. 4 shows a graph presenting the relationship between number of preheater stages, drying capacity and specific heat consumption for the clinker production operation in a given installation. For instance, this graph shows that the optimized required heat value of a given production unit comprising four preheating stages is 750 Kcal per kg of clinker. For this given installation, the optimized required heat value of the kiln and the precalciner for clinker production operation is around 700 to 800 Kcal per kg of clinker.

Advantageously, fuel is supplied in a quantity corresponding to more than 110%, preferably more than 120%, preferably more than 125%, preferably more than 140%, preferably more than 160% of the optimized required heat value per unit weight of clinker for the clinker production operation, and more preferably more than 200%. In other words, in the four preheating stage unit of the FIG. 4, consuming 750 kcal per kg of clinker for clinker production operation, fuel is supplied in a quantity corresponding to more than 825 kcal per kg of clinker, preferably more than 900, 937.5, 1050, 1200 kcal per kg of clinker, and more preferably more than 1500 kcal per kg of clinker. However, we note that the amount of additional fuel may be limited by the maximum thermal load capacity of the kiln and/or the precalciner and/or by the amount of pollutant gas release for instance. Additional fuel is added in the kiln 5 and/or in the precalciner combustor 3. Preferably additional fuel is added in both the kiln 5 and the precalciner combustor 3.

According to the invention, a portion of the hot flue gases 50 and 51 are bypassed from the rotary kiln 5, and sent to the precalciner cyclone separator 4 and directly to a heat recovery steam generator 7, respectively. A portion of the hot flue gases 52 and 53 are also bypassed from the precalciner cyclone separator 4 and from the preheaters 2, respectively, and sent to the heat recovery steam generator 7. In a preferred embodiment, bypassed flue gases are collected both from the kiln 5 and from the precalciner separator 4.

Preferably, flue gases 51 extracted from the kiln contain/represents all flue gases discharged from the kiln 5, and flue gases 52 extracted from the precalciner separator 4 contain the maximum amount of hot flue gases compatible with the preheating operation of the clinker production process, in such a way that flow 44 is the minimum possible below 1.5 ton of gases per ton of clinker. Flows 53, 62, 63 may be needed for control purposes. It should be pointed out that using 480° C./60 bars-absolute superheated steam, precalciner flue gases at 900° C. and rotary kiln flue gases at 1200° C. yield around 90 and 140 kilowatts per metric ton per hour of flue gases, respectively.

Moreover, the ratio of hot flue gases by-passed from the rotary kiln to the hot flue gases bypassed from the precalciner is less than 1, preferably less than 0.5 and more preferably less than 0.35. Preferably, this ratio is comprised between 0.15 and 0.35. Thus, the temperature and the flow of the hot flue gases led to the heat recovery steam generator 7 are optimized in order to maximize the electricity production and to observe thermal constraints imposed by the steam generator 7. Indeed, the temperature and the flow of the hot flue gases led to the heat recovery steam generator 7 must be maximal to maximize the heat exchange but their temperature must be limited by the maximum thermal load of the steam generator 7.

Furthermore, a portion of the hot flue gases 53 may be bypassed from at least one of the preheater stage 2 previous to the first that receives the raw meal. This flow 53, together with flow 63, principally contributes to the process control. In a particular embodiment, the installation comprises additional gas/solid separation means, not shown, to further decrease the amount of dust in any or all extracted flows 51 to 53.

The heat recovery steam generator 7 receives water either directly from the water stream 70 coming from the power island or from water stream 71 coming from water economizer 9 and produces superheated steam 72 conducted to a power island, not shown, to produce electrical power. The power island comprises a steam turbine driven by the steam and an electrical generator. In the present invention, heat content of the hot flue gases 50 to 53 is recovered to produce superheated steam with temperature higher than 400° C. and a pressure higher than 35 bars-absolute, and preferably 60 bars-absolute or more. Therefore, the steam turbine is a high-pressure turbine and not a low pressure, low efficiency turbine as used in the known cogeneration process in the cement industry. Furthermore, low pressure steam may be collected from the power island, for any purpose.

Moreover, cement clinker raw material may be partially introduced through flows 80 to 82, in addition to 10, for control purposes. In the preferred embodiment of the invention illustrated on FIG. 1, the installation comprises a water economizer 9 wherein feed water 71 of the steam generator 7 is heated by flue gases 44 discharged from the preheater 1. In a preferred embodiment, the water economizer 9 receives water 70 coming from the power island. Preferably, to further increase the electricity generation and/or to compensate for any disturbance in the cement clinker production process due to the extraction of the hot flue gas through the bypass, a portion of the cooled flue gases 54 and/or 45 coming from the steam generator 7 and from the water economizer 9, respectively, are injected, mixed or not, by recirculation fan(s) 8 to the kiln 5 (arrow 60), to the precalciner combustor 3 (arrow 61), and, if needed, to the preheaters 1 and 2 (arrows 62, 63).

The aim of flows 60 and 61 is to increase the electrical energy generation by increasing the volume of hot flue gases gas extractions 52, 53 from the precalciner separator 4 and from the preheaters 1, 2 and directed to the heat recovery steam generator 7.

Figure 3:
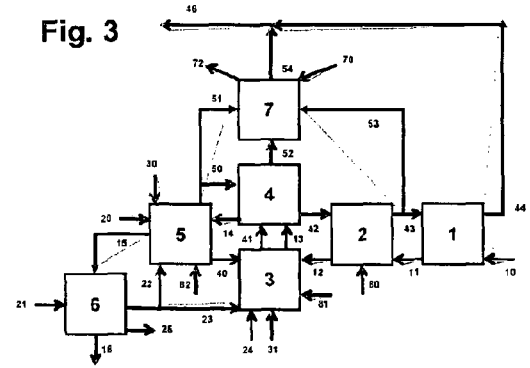
FIG. 3 is a schematic diagram of a third embodiment of the invention.

In the embodiment illustrated on FIG. 3, additional air is not injected directly to the preheaters 1, 2 and air injected into the preheaters 1, 2 may come from the cement clinker cooler 22 and/or 23 and/or from any other source 20 and/or 24. It should be pointed out that the convenience to install both, the cooled flue gases recirculation device 8 and the additional water economizer 9 to complement the heat recovery steam generator 7, depends on a case-by-case basis.

Furthermore, there are many variants, as anyone with ordinary skills in the cement clinker production process knows, but variants have been reduced for the sake of simplicity and not by way of limitation of this invention. For example, diverse fuels may be introduced in many different ways; separate combustion chambers may be used, and so on.

The following table illustrates the amount of generated power for different examples of the method according to the invention:

| | Fuel supplied to the kiln and to the precalciner (in % of the optimized heat value requirement) | Fuel supplied to the kiln and to the precalciner (in Kcal/kg of clinker) | Bypassed flue gases from the kiln and the precalciner (in tons of gases per ton of clinker) | Generated Power (in kWh/ton of clinker) | 50 + 51 Bypassed flue gases from the kiln (in tons of gases per ton of clinker) | 52 Bypassed flue gases from the precalciner (in tons of gases per ton of clinker) | 50 + 51 Generated Power (in kWh/ton of clinker) due to Bypassed flue gases from the kiln | 52 Generated Power (in kWh/ton of clinker) due to Bypassed flue gases from the precalciner | 50 + 51 Heat in the Bypassed flue gases from the kiln (in % of the total heat supplied) | 52 Heat in the Bypassed flue gases from the precalciner (in % of the total heat supplied) |
|---|---|---|---|---|---|---|---|---|---|---|
| Base Case | 100 | 945 | 0 | 0 | 0 | 0 | 0 | 0 | 0 | 0 |
| 1 | 115 | 1085 | 1.22 | 124 | 0.2 | 1.02 | 30 | 94 | 6 | 22 |
| 2 | 146 | 1378 | 2.89 | 293 | 0.5 | 2.39 | 74 | 219 | 12 | 39 |
| 4 | 181 | 1709 | 3.89 | 454 | 1.7 | 2.19 | 253 | 201 | 33 | 29 | besides allow regulating the temperature of the kiln and the precalciner, respectively. Using recirculated flue gases, instead of excess air, increases overall efficiency of the cement clinker production unit and increases flue gases carbon dioxide concentration. If no flue gas is recirculated, flow 46 increases and efficiency decreases.

The increase in carbon dioxide concentration through the use of gas recirculation makes easier its extraction from flue gases. Thus, the invention contributes to avoid global warming. The aim of flows 62 and 63 is to compensate for any disturbance in the preheaters 1, 2 due to the extraction of the hot flue gases through the by-passes 52 and 53, respectively.

All control options described are needed to control exit flue gas emissions; fouling, incrustation and corrosion of the heat recovery steam generation pipes; refractory temperatures, among other variables, besides helping control the clinker production process for a maximum electrical energy generation. However their use will depend upon the composition of fuels and raw materials, the cement clinker unit design and so on. Of course, gases flows are lead in ducts equipped with ancillary devices such as fans and gas flow control valves, not shown.

Figure 2:
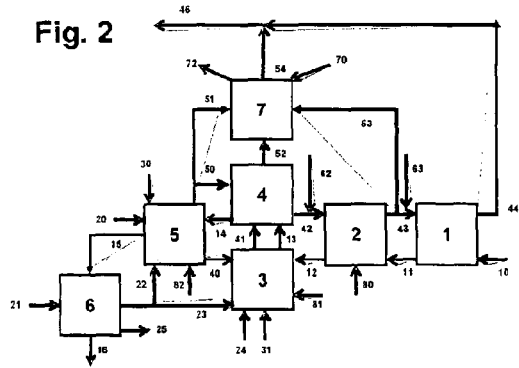
FIG. 2 is a schematic diagram of a second embodiment of the invention.

FIG. 2 and FIG. 3 illustrate alternate embodiments of the invention. FIG. 2 illustrates an installation, according to the invention, which does not comprise a cooled flue gases recirculation device 8 and a water economizer 9. In this embodiment, air is injected through 62 and 63 to compensate hot flue It is to be understood that, within the scope of the appended claims, the invention may be practiced otherwise than as specifically described herein.

The invention claimed is:

1. A method to produce electricity in a cement clinker production unit, comprising:
   providing the cement clinker production unit with rotary kiln and a precalciner as combustion chambers to generate electricity, the precalciner comprising successively a precalciner combustor receiving raw meal and generating at least partially precalcined meal and a precalciner separator receiving the at least partially precalcined meal from the precalciner combustor;
   supplying a first quantity of fuel to the precalciner and a second quantity of fuel to the rotary kiln, the sum of the first quantity and the second quantity corresponding to at least 110% of an optimized heat value requirement for the clinker production operation of the precalciner and the rotary kiln per unit weight of clinker;
   leading hot flue gasses from the rotary kiln, through the precalciner combustor, through the precalciner separator, and to a heat recovery steam generator along a first flow path, wherein the heat recovery steam generator produces steam;
   bypassing a portion of hot flue gases from the rotary kiln that includes bypassing a first portion of hot flue gases from the rotary kiln and bypassing a second portion of hot flue gases from the precalciner separator and wherein a ratio of mass flow rate of the first portion of hot flue gases and the second portion of hot flue gases is less than 0.5;

leading the first portion of hot flue gases from the rotary kiln to the heat recovery steam generator along a second flow path, wherein the second flow path does not pass through the precalciner separator or the precalciner combustor;

leading the second portion of hot flue gases from the rotary kiln, through the precalciner separator, and to the heat recovery steam generator along a third flow path; and producing electricity with a power island comprising a steam turbine equipped with an electrical generator operable in response to the produced steam.

2. The method according to claim 1, wherein the heat recovery steam generator produces steam with a temperature higher than 400° C. and pressure higher than 35 bars-absolute and the steam turbine is a high-pressure turbine.

3. The method according to claim 2, wherein the cement clinker production unit comprises at least one preheater from which hot flue gases are further bypassed.

4. The method according to claim 3, wherein additional air is injected directly into the at least one preheater to compensate for any disturbance in the cement clinker production operation.

5. The method according to claim 3, further comprising the step of:

injecting cooled flue gases discharged from the heat recovery steam generator or coming from the at least one preheater into at least one of the rotary kiln and the precalciner and the at least one preheater.

6. The method to claim 3, using an additional water economizer, wherein feed-water of the heat recovery steam generator is heated by flue gases discharged from the at least one preheater.

7. The method according to claim 6, wherein the additional water economizer receives water from the power island.

8. The method according to claim 1, wherein the first quantity of fuel supplied to the precalciner and the second quantity of fuel supplied to the rotary kiln has a sum corresponding to more than 120% of the optimized heat value requirement per unit weight of clinker.

9. The method according to claim 1, wherein the bypassed portion of the hot flue gases is bypassed from the rotary kiln and the precalciner.

10. The method according to claim 9, wherein the ratio of mass flow rate of the first portion of hot flue gases by-passed from the rotary kiln and the second portion of hot flue gases bypassed from the precalciner separator is less than 0.35.

11. The method according to claim 9, wherein the by-passed hot flue gases are mixed and dedusted before entering in the heat recovery steam generator.

12. The method according to claim 1, wherein additional air is directly injected into at least one of the precalciner and the rotary kiln as combustion air.

13. The method according to claim 1, wherein the power island sends back to the cement clinker production unit water preheated by feed water heaters to avoid at least one of corrosion and incrustation.

* * * * *